US009190669B2

(12) United States Patent
Wood et al.

(10) Patent No.: US 9,190,669 B2
(45) Date of Patent: Nov. 17, 2015

(54) CELL MATERIALS VARIATION IN SOFC STACKS TO ADDRESS THERMAL GRADIENTS IN ALL PLANES

(75) Inventors: Anthony Wood, Calgary (CA); Zheng Tang, Calgary (CA)

(73) Assignee: VERSA POWER SYSTEMS, LTD. (CA)

(*) Notice: Subject to any disclaimer, the term of this patent is extended or adjusted under 35 U.S.C. 154(b) by 1177 days.

(21) Appl. No.: 11/879,388

(22) Filed: Jul. 17, 2007

(65) Prior Publication Data

US 2008/0081229 A1 Apr. 3, 2008

Related U.S. Application Data

(63) Continuation-in-part of application No. 11/542,102, filed on Oct. 2, 2006, now Pat. No. 8,313,875.

(51) Int. Cl.
*H01M 4/86* (2006.01)
*H01M 4/90* (2006.01)
*H01M 4/92* (2006.01)
*H01M 8/02* (2006.01)
*H01M 8/12* (2006.01)
*H01M 4/88* (2006.01)
*H01G 11/52* (2013.01)

(52) U.S. Cl.
CPC .............. *H01M 4/8621* (2013.01); *H01G 11/52* (2013.01); *H01M 4/8642* (2013.01); *H01M 4/8652* (2013.01); *H01M 4/8882* (2013.01); *H01M 4/9066* (2013.01); *H01M 4/921* (2013.01); *H01M 8/0232* (2013.01); *H01M 8/0241* (2013.01); *H01M 8/0297* (2013.01); *H01M 8/124* (2013.01); H01M 2008/1293 (2013.01); Y02E 60/13 (2013.01); Y02E 60/521 (2013.01); Y02E 60/525 (2013.01)

(58) Field of Classification Search
USPC ......... 429/40, 44, 45, 30, 32, 26, 13, 17, 507, 429/508, 509, 514, 513, 467, 468, 469, 457, 429/465, 495, 442
See application file for complete search history.

(56) References Cited

U.S. PATENT DOCUMENTS

| 3,510,356 | A | 5/1970 | Richman |
| 3,522,097 | A | 7/1970 | Tedmon, Jr. et al. |
| 5,589,017 | A | 12/1996 | Minh |
| 5,589,285 | A | 12/1996 | Cable et al. |
| 5,676,806 | A | 10/1997 | Van Berkel et al. |
| 6,004,696 | A | 12/1999 | Barnett et al. |
| 6,007,683 | A | 12/1999 | Jankowski et al. |
| 6,171,721 | B1 | 1/2001 | Narayanan et al. |
| 6,183,897 | B1 | 2/2001 | Hartvigsen et al. |
| 6,420,064 | B1 | 7/2002 | Ghosh et al. |
| 6,750,169 | B2 | 6/2004 | Ghosh et al. |
| 6,893,760 | B2 | 5/2005 | Shibata et al. |
| 7,033,637 | B1 | 4/2006 | Hunt et al. |
| 7,056,613 | B2 | 6/2006 | Bai et al. |
| 2001/0044041 | A1* | 11/2001 | Badding et al. ................ 429/32 |
| 2001/0044043 | A1 | 11/2001 | Badding et al. |
| 2003/0165732 | A1 | 9/2003 | McElroy |
| 2004/0142229 | A1 | 7/2004 | Herman et al. |
| 2004/0161641 | A1 | 8/2004 | Lee et al. |
| 2007/0031272 | A1 | 2/2007 | Adzic et al. |
| 2007/0160884 | A1 | 7/2007 | Aoyama et al. |
| 2007/0298299 | A1 | 12/2007 | Izawa et al. |
| 2008/0081229 | A1 | 4/2008 | Wood et al. |
| 2008/0081243 | A1 | 4/2008 | Wood et al. |

FOREIGN PATENT DOCUMENTS

| AU | 2008277838 A1 | 1/2009 |
| AU | 2008277838 B2 | 1/2009 |
| DE | 10163013 A1 | 7/2003 |
| EP | 1127382 B1 | 8/2001 |
| EP | 1486577 A1 | 12/2004 |
| EP | 1786056 | 5/2007 |
| EP | 2176906 A1 | 4/2010 |
| JP | 2005050636 | 2/2005 |
| JP | 2005327507 | 11/2005 |
| JP | 2005327637 | 11/2005 |
| WO | WO98/40921 A | 9/1998 |
| WO | 01-28024 A1 | 4/2001 |
| WO | 01-89017 A1 | 11/2001 |
| WO | 2005/062408 A | 7/2005 |
| WO | 2005/062412 A | 7/2005 |
| WO | 2008/040660 A | 4/2008 |
| WO | 2009/010384 A1 | 1/2009 |

OTHER PUBLICATIONS

Kilbride, I.P., "Preparation and Properties of Small Diameter Tubular Solid Oxide Fuel Cells for Rapid Start-Up", Journal of Power Sources, 61 (1996), pp. 167-171.
Haanappel, V.A.C. et al., "The Influence of Noble-Metal-Containing Cathodes on the Electrochemical Performance of Anode-Supported SOFCs", Journal of Power Sources, 130 (2004) pp. 119-128.
Hatchwell, C.E. et al., .Cathode Current-Collectors for a Novel Tubular SOFC Design, Journal of Power Sources, 70 (1998) pp. 85-90.
Baker, R. et al., "Classification Criteria for Solid Oxide Fuel Cell Electrode Materials," *J. Electrochem. Soc.*, 144, (7), pp. 2427-2432 (Jul. 1997).

(Continued)

*Primary Examiner* — Raymond Alejandro
(74) *Attorney, Agent, or Firm* — Foley & Lardner LLP (57) ABSTRACT

A solid oxide fuel cell, and methods for modifying the temperature thereof, the fuel cell having a plurality of planar layered fuel cell units, an electrically conductive flow separator plate disposed between each of the fuel cell units, and a cathode contact material element disposed between each cathode electrode of the fuel cell units and each electrically conductive flow separator plate. The cathodes of the individual fuel cell units are modified such that the operating temperatures of the cathodes are matched with the temperatures they experience based upon their locations in the fuel cell stack. The modification involves adding to the cathode contact material and/or cathode at least one alloying agent which modifies the temperature of the cathode electrodes based upon the location of the cathode electrodes within the fuel cell stack. These alloying agents react with a component of the cathode electrode to form alloys.

16 Claims, 8 Drawing Sheets

(56) References Cited

OTHER PUBLICATIONS

Simner, S.P. et al., "Performance Variability of La(Sr)FeO$_3$ SOFC Cathode with Pt, Ag, and Au Current Collectors," *J. Electrochem. Soc.*, 152 (9) A1851-A1859 (2005).

Hatchwell, C. et al., "Current Collectors for a Novel Tubular Design of Solid Oxide Fuel Cell," *J. Power Sources*, 77 (1999) 64-68.

Li, S. et al., "New Sulfur-Tolerant Electrode Materials for H$_2$S Removal and SOFCs", *Electrochemical Society Proceedings*, vol. 2002-26, pp. 113-121.

Chang, C. et al., "Cathode Performance and Oxygen-Ion Transport Mechanism of Copper Oxide for Solid-Oxide Fuel Cells", *J. Solid State Etectrochem*, (2003) 7: 125-128.

Belyaev, V. D. et al., "Oxidative Conversion of Methane on Cu and Ag—Ni Electrodes at Articificial Unsteady-State Mode of the SOFC Reactor Operation", *New Aspects of Spillover Effect of Catalysis*, Elsevier Science Publishers B.V., pp. 213-216 (1993).

Smith, M. et al., "Sulfur-Tolerant Cermet Anodes", *Electrochemical Society Proceedings*, vol. 2005-07, pp. 1437-1443.

Indacochea, J. E. et al., "Interface Development in Joining Yttria Stabilized Zirconia to Stainless Steel by In-Situ Alloying with Ni/Ti Filler Metals," *Duffusion and Defect Data. Solid Sate Data. Park B, Solid State Phenomena*, Vacuz, Li. vol. 127, May 18, 2006, pp. 19-24.

Indacochea, et al. "Interface Development in Joining Yttria Stabilized Zirconia to Stainless Steel by In-Situ Alloying with Ni/Ti Filler Metals," Solid State Phenomena, 2007, pp. 19-24, Vo. 127, Trans Tech Publications, Switzerland.

International Search Report and Written Opinion of PCT/EP2007/060174 mailed on Jan. 18, 2008, 8 pages.

International Search Report and Written Opinion of PCT/EP2008/058414 mailed on Sep. 26, 2008, 11 pages.

\* cited by examiner

CELL MATERIALS VARIATION IN SOFC STACKS TO ADDRESS THERMAL GRADIENTS IN ALL PLANES

CROSS REFERENCE TO RELATED APPLICATION

This application is a continuation-in-part application of U.S. patent application Ser. No. 11/542,102, filed 2 Oct. 2006, and issued as U.S. Pat. No. 8,313,875.

BACKGROUND OF THE INVENTION

1. Field of the Invention

This invention relates to solid oxide fuel cell (SOFC) stacks and materials to address thermal gradients in all planes (x, y and z) of the stack. This invention further relates to contact materials which provide electrical conductivity between the electrodes and the separator plates disposed between adjacent fuel cell units. This invention further relates to cathode modifications whereby the operating temperature of the cathode of each fuel cell unit, as well as within a fuel cell unit, is matched with the temperature that it experiences based upon its location in the fuel cell stack and anticipated temperature gradient.

2. Description of Related Art

A solid oxide fuel cell is a solid electrochemical cell comprising a solid gas-impervious electrolyte sandwiched between a porous anode and porous cathode. Oxygen is transported through the cathode to the cathode/electrolyte interface where it is reduced to oxygen ions, which migrate through the electrolyte to the anode. At the anode, the ionic oxygen reacts with fuels such as hydrogen or methane and releases electrons. The electrons travel back to the cathode through an external circuit to generate electric power.

The constructions of conventional solid oxide fuel cell electrodes are well known. Electrodes are often composites of electron- and ion-conducting materials. For example, an anode may comprise electronic conducting nickel (Ni) and ionic conducting yttria stabilized zirconia (YSZ) and a cathode may comprise a perovskite such as $La_{1-x}Sr_xMnO_{3-\delta}$ (LSM) as the electron conducting material and YSZ as the ionic conducting material. Because of the high activation energy for oxygen reduction of perovskites, noble metals such as Au, Ag, Pt, Pd, Ir, Ru, and other metals or alloys of the Pt group may be added or used to replace the perovskite phase to reduce the activation energy as taught by U.S. Pat. No. 6,420,064 and U.S. Pat. No. 6,750,169, both to Ghosh et al. Furthermore, the noble metal may be alloyed to modify the optimum operating temperature range as disclosed by U.S. patent application Ser. No. 11/542,102 to Wood et al., issued as U.S. Pat. No. 8,313,875, which is incorporated in its entirety by reference herein.

Each individual fuel cell, also referred to herein as a fuel cell "unit", generates a relatively small voltage. Thus, to achieve higher, more practically useful voltages, the individual fuel cell units are connected together in series to form a fuel cell stack. The fuel cell stack includes an electrical interconnect, or separator plate, typically constructed of ferritic stainless steel, disposed between the anode and cathode of adjacent fuel cell units, as well as ducts or manifolding, either internal or external, for conducting the fuel and oxidant into and out of the stack. In addition to separating adjacent fuel cell units, the separator plates distribute gases to the electrode surfaces and may act as current collectors. Electrically conductive contact pastes are used to bond the electrodes to the separator plates. U.S. Pat. No. 6,420,064 to Ghosh et al. discloses a cathode contact paste comprised of lanthanum cobaltate.

Conventional solid oxide fuel cells are operable at temperatures in the range of about 600° C. to about 1000° C., but generally exhibit high performance at operating temperatures only in the range of about 700° C. to about 1000° C. In a large scale, multi-layer solid oxide fuel cell stack, there can occur significant temperature variations in all planes, x, y and z. Stack temperature variations on the order of about 100° C. to about 200° C. have been measured. The ends of the fuel cell stacks are the coolest, resulting in low cell voltage and high degradation at the end cells when the cells in the center are operating in a reasonable temperature range that is not too hot for the ferritic stainless steel separator plates. On the other hand, when the stack is operated at sufficient temperatures such that the end cells are in a reasonable operating range, the center cells are too hot and excessive degradation occurs due to oxidation of the separator plates. For large area cells, it is easy to imagine similar effects in the x-y planes, leading to localized degradation or low performance.

Thus, there is a need for a solid oxide fuel cell stack having a materials system that can tolerate a large operating temperature range. In practice, this range may be too large for a single materials system and there may be a need for a simple, low cost method of modifying the materials system locally to accommodate temperature variations.

SUMMARY OF THE INVENTION

It is, thus, one object of this invention to provide a simple, low cost method and system for use in fuel cell stacks which enables localized modification of the materials system to accommodate a range of operating temperatures of fuel cells in the center of the stack below the temperatures at which excessive oxidation of the separator plates occurs while maintaining the cell performance of the end cells at a temperature lower than the typical materials system would allow efficient operation.

Solid oxide fuel cell stacks typically generate excess heat due to the exothermic nature of the fuel cell reactions. In order to thermally manage the stack, there will be a thermal gradient to lose this heat and, thus, a temperature gradient will be experienced by the cells. This invention addresses the thermal gradient issue set forth herein above by modifying the properties of the cathodes at specific, previously chosen locations within the fuel cell stacks close to the outer perimeter of the solid oxide fuel cell stack such that the modified cathode operates optimally at these lower temperatures experienced.

Specifically, the cathodes of the individual fuel cell units are modified such that the operating temperatures of the cathodes are matched with the temperatures they experience based upon their locations in the fuel cell stack at the nominal operating condition. Such modification comprises adding to the cathode contact material and/or cathode at least one alloying agent which modifies the low temperature performance of each cathode electrode based upon the location of the cathode electrode within the fuel cell stack. These alloying agents alloy with the metal inherent in the cermet electrode to form alloys. The concentration of the alloying agent in the cathode contact material can be varied throughout the stack in all planes (x, y, and z), without affecting the cell process, to provide desired electrochemical activity throughout the stack, despite reasonably large temperature variations (100° C. to 200° C.). It will be appreciated that, depending upon the location of the cathode electrodes within the fuel cell stack, the use of an alloying agent in connection with one or more of the cathode electrodes may not be necessary in order to achieve the desired high cell efficiency and low stack degradation rate for the cathode electrodes at such locations.

BRIEF DESCRIPTION OF THE DRAWINGS

This and other objects and features of this invention will be better understood from the following detailed description taken in conjunction with the drawings, wherein.

DETAILED DESCRIPTION OF THE PRESENTLY PREFERRED EMBODIMENTS

Figure 1:
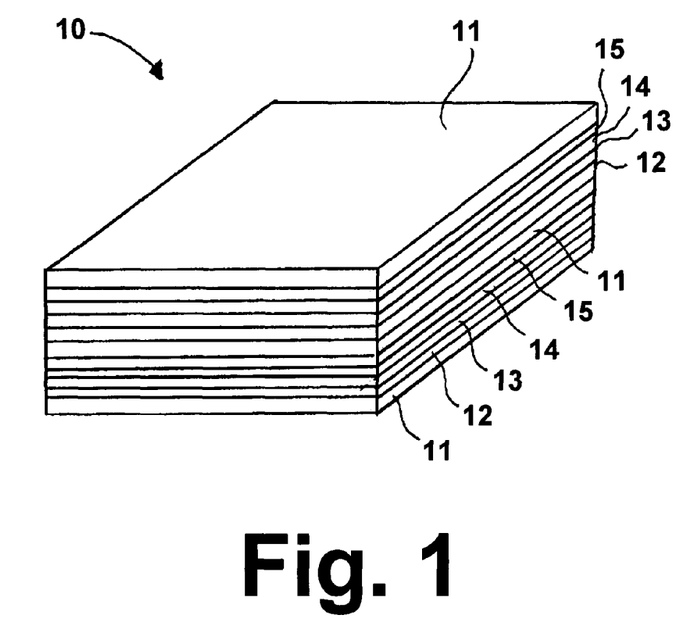
FIG. 1 is a perspective view of a portion of a solid oxide fuel cell stack.

The invention disclosed herein is a solid oxide fuel cell stack in which the operating temperatures of the cathode electrodes of the fuel cell units comprising the fuel cell stack are matched with the temperatures that they experience based upon their locations within the fuel cell stack. As shown in FIG. 1, the stack 10 comprises a plurality of planar layered solid oxide fuel cell units, each of which comprises a solid electrolyte 14 sandwiched between an anode electrode 15 and a cathode electrode 13. An electrically conductive flow separator plate 11 is disposed between the anode electrode and the cathode electrode of each pair of adjacent fuel cell units, and a cathode contact layer 12 is disposed between each cathode electrode 13 and each electrically conductive flow separator plate 11. At least one of the cathode contact layers and/or at least one of the cathode electrodes comprises an alloying agent, which reacts with a component of the cathode electrodes to form an alloy, thereby improving the low temperature operation of the cathode electrode and, thus, the corresponding fuel cell unit, based upon the location of the cathode electrode within the plurality of layered fuel cell units. The amount of alloying agent may be varied in the x-, y- and/or z-planes to achieve the desired response to the thermal environment experienced. In accordance with one embodiment of this invention, the alloying agent is a metal selected from the group consisting of Au, Ag, Pt, Cr, Nb, and mixtures and alloys thereof. The amount of alloying agent employed may be in the range corresponding to about 1% to 65% by weight (35% to 99% by weight palladium or other noble metal) of the alloy, but is preferably in the range corresponding to about 1% to about 50% by weight of the alloy.

The fuel cell units, sometimes referred to herein as TSC-2 cells (these cells comprising cathodes in accordance with the teachings of the '064 and '169 patents to Ghosh et al. discussed herein above), employed in the fuel cell stack in accordance with one embodiment of this invention are anode supported cells in which an anode functional layer having a thickness in the range of about 5-20 microns, a solid electrolyte having a thickness in the range of about 5-10 microns, and a cathode functional layer having a thickness in the range of about 2-10 microns are screen printed directly onto a green anode substrate tape having a thickness of about 0.3-2 mm (produced by tape casting) to produce a multi-layer green cell, which is sintered in a co-firing process to produce the fuel cell unit. Conventional materials may be employed for producing the individual components of the fuel cell units.

As previously indicated, the fuel cell units are separated by corrosion-resistant interconnects or flow separator plates. Contact pastes, which must be electrically conductive and which constitute the cathode contact layer 12, are used to bond the electrodes to the interconnects. In accordance with one embodiment of this invention, the contact paste comprises lanthanum cobaltate (LC). In accordance with another embodiment of this invention, the contact paste comprises lanthanum cobalt nickel oxide (LCN), but any typical ceramic cathode contact material known in the art may be utilized, such as those in accordance with the teachings of U.S. Pat. No. 7,190,568.

The contact paste may be applied by screen printing a layer of LCN onto the cathode surface after the co-firing process. The LCN particles enter the porous cathode structure during the printing process. The layer is then fired in-situ at the operating temperature of the fuel cell unit, about 700° C. to about 800° C.

In accordance with one embodiment, this invention allows the selective use of cathode materials in a solid oxide fuel cell stack at each desired temperature by modifying the palladium:silver ratio in palladium cathode electrodes. Tests of solid oxide fuel cells comprising cathode electrodes having palladium and silver have shown improved low temperature operation compared with palladium cathode electrodes having no silver.

In particular, alloying of silver with palladium in the cathode of a TSC-2 cell has been shown to lower the oxide transition temperature of the alloy and improve the low temperature cell performance. TSC-2 cells have an optimum operating temperature range above about 725° C. The addition of silver to the cathode contact layer adjacent to the cell (fine microstructured lanthanum cobalt nickel oxide (LCN)) and subsequent in-situ diffusion under solid oxide fuel cell operating conditions has been shown to be effective for achieving improvements in low temperature cell performance.

Figure 2:
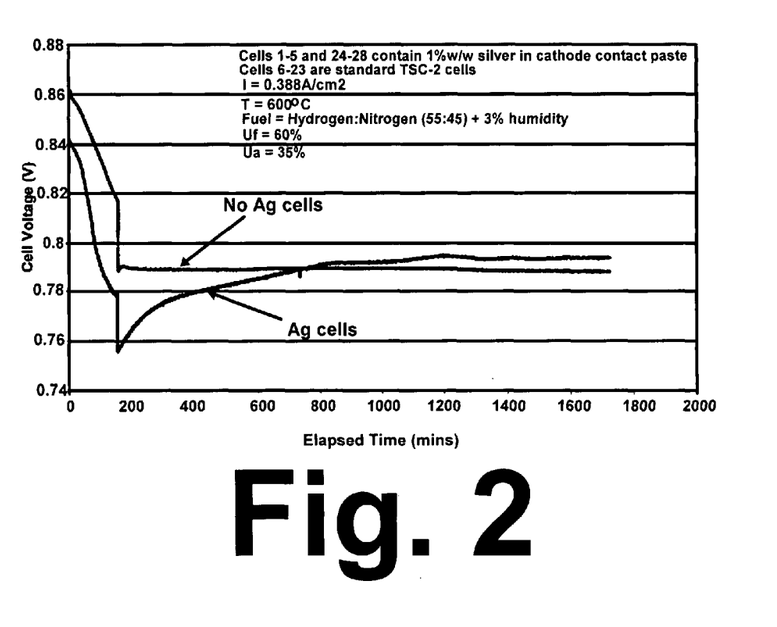
FIG. 2 is a diagram showing stack operation where 5 fuel cell units at each end of a 28-unit stack have 1% by weight addition to the cathode contact material of an alloying agent.

FIG. 2 shows stack performance at a furnace temperature of about 600° C. of a stack having 28 fuel cell units. Five fuel cell units at each end of the stack had a 1% w/w silver addition to the cathode contact material. As can be seen, the average cell voltage for the end cells with silver addition to the cathode contact material is about the same as for the TSC-2 cells in the middle of the stack. By virtue of the silver addition, the stacks are able to operate at the same operating power as TSC-2 cells at 50° C. to about 100° C. lower temperatures than the optimum operating temperatures for TSC-2 cells. Thus, with the addition of silver to the end cells of the stack, the center of the stack can be at a peak operating temperature for TSC-2 cells while the cells at the ends of the stack are at a peak operating temperature for the alloyed cells, and nowhere in the stack does the temperature need to exceed what is reasonable for the ferritic stainless steel interconnects.

In general, we have found that stack degradation rates at 0.388 A/cm², fuel utilization (Uf)=65%, air utilization (Ua)=30%, and fuel=hydrogen:nitrogen (55:45) with 3% humidity average around 2-4% degradation per 1000 hrs. Table 1 shows the degradation rates based on average cell voltages obtained for five test stacks.

TABLE 1

| Test No. | Degradation Rate/ 1000 hrs, % | Cell voltage, mV | Uf/Ua | Current, A | Temperature, °C. | Run Time, hrs |
|---|---|---|---|---|---|---|
| 1 | 3.48 | 27.4 | 65/40 | 47 | 680 | 1175 |
| 2 | 3.50 | 25.7 | 65/40 | 47 | 670 | 1320 |
| 3 | 3.40 | 27.2 | 65/40 | 47 | 670 | 1000 |
| 4 | 2.93 | 24.1 | 65/40 | 47 | 670 | 1440 |
| 5 | 3.06 | 24.8 | 35% DIR, 65/40 | 47 | 700 | 741 |

Figure 3:
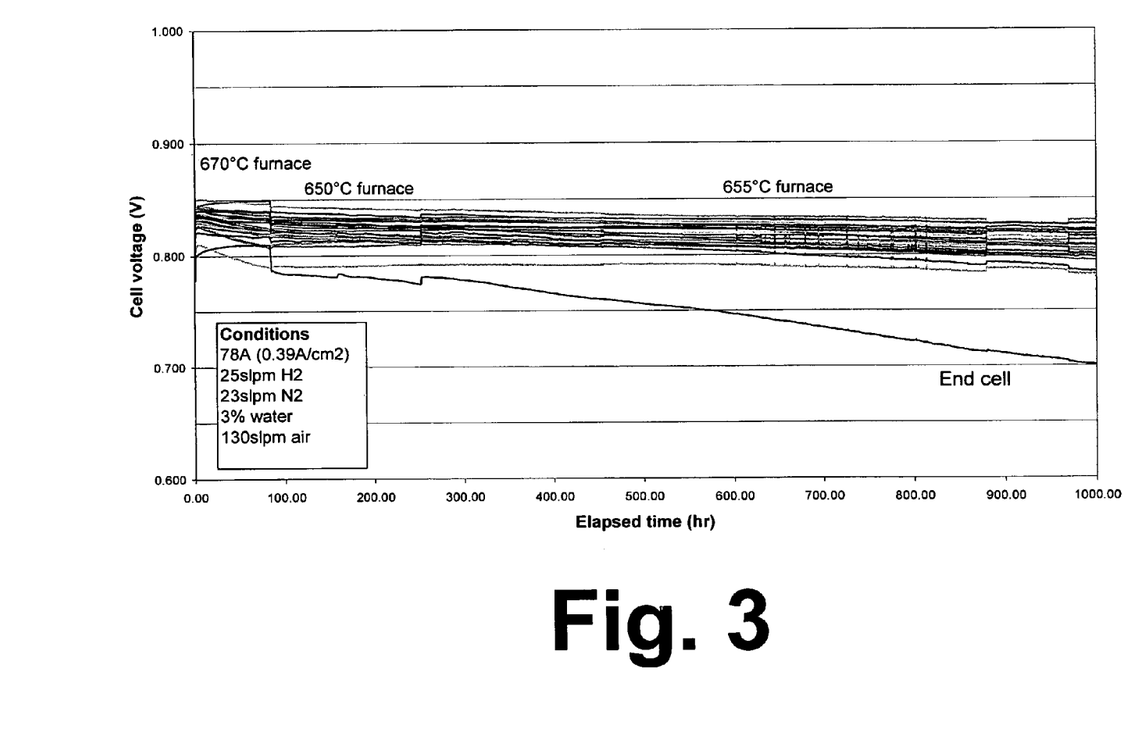
FIG. 3 is a diagram showing the high level of degradation that occurs at the ends of conventional solid oxide fuel cell stacks.

However, this average is higher than the materials system capability due to cells at the ends of the stack degrading much faster due to low temperature operation as seen in FIG. 3.

Figure 4:
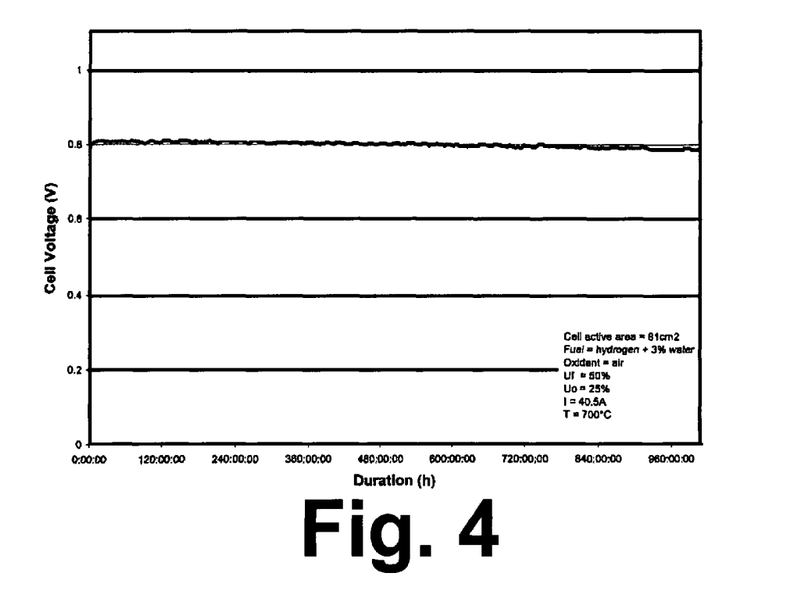
FIG. 4 is a diagram showing the steady-state operation of a solid oxide fuel cell stack in accordance with one embodiment of this invention resulting from a test at a temperature of about 700° C.
Figure 5:
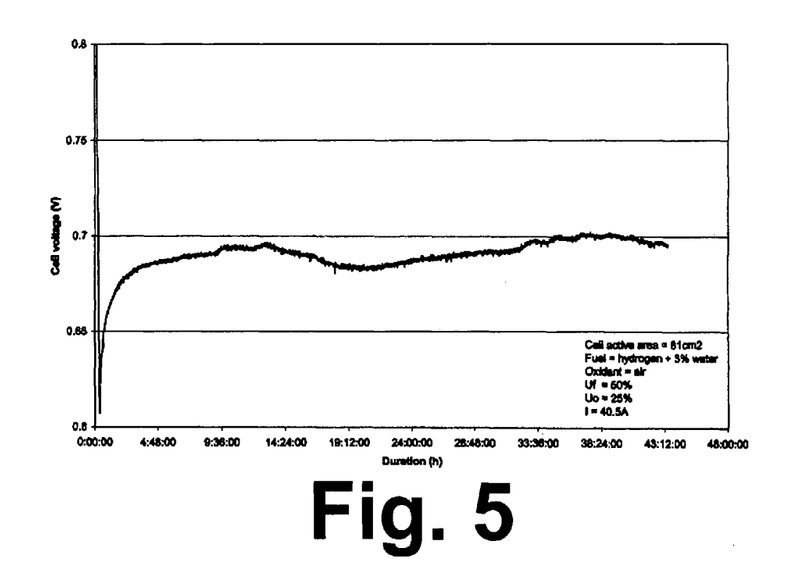
FIG. 5 is a diagram showing the steady-state operation of a solid oxide fuel cell stack in accordance with one embodiment of this invention resulting from a test at a temperature of about 650° C.

Two cell tests were run with 1% w/w silver addition to the LCN cathode contact paste layer printed onto the cell (when alloyed, this is equivalent to ~40% v/v silver in the alloy), one test at 700° C. and the other test at 650° C. Test conditions for both tests were the same—0.5 A/cm², 50% Uf and 25% Ua with 3% humidified hydrogen as fuel. The steady-state operations at these test conditions are shown in FIGS. 4 and 5. Initial degradation rates were less than about 0.5% per 1000 hours (calculated) over the first 500 hours.

To determine the extent of silver diffusion from the LCN cathode contact paste into the cathode, five samples were prepared with different amounts of silver added to the LCN cathode contact layer as follows:

0.5 wt % Ag in LCN
1 wt % Ag in LCN
2 wt % Ag in LCN
3 wt % Ag in LCN
10 vol % Ag in LCN The screen-printing inks comprised 75% w/w solids loading of Ag-LCN cathode contact powders with an organic vehicle making up the remaining 25% w/w. The cathode contact pastes were screen-printed in a 1×1 cm square pattern onto TSC-2 cell cathodes and dried. The samples were co-fired to 900° C. for 5 hrs. After sintering, the samples were analyzed to determine the extent of silver diffusion in the lateral plane (x-y) from the printed area.

Figure 6:
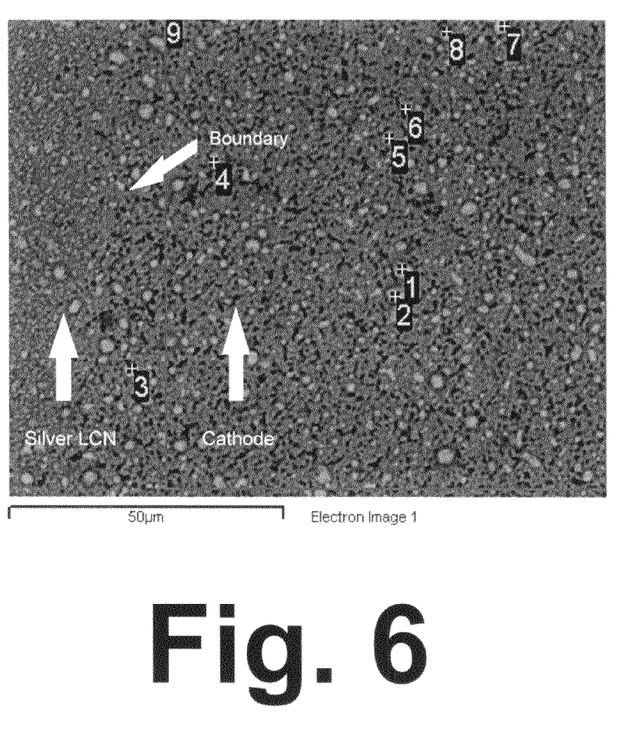
FIG. 6 is an SEM image of a cathode and diffusion zone for 10% v/v silver in a cathode contact paste sample fired at 900° C. for 5 hours.

It was observed visually that the silver had migrated to the cathode surface. Scanning electron microscopy (SEM) with energy dispersive X-ray analysis (EDX) was used to see how far the silver diffused. FIG. 6 shows an SEM image of the edge of the cathode contact layer containing silver and the cathode adjacent to this layer. Table 2 shows an EDX analysis of the points labeled 1-9 in FIG. 6 to illustrate silver:palladium ratios at various locations.

TABLE 2

| Spectrum | O | Zr | Pd | Ag | Total |
|---|---|---|---|---|---|
| 1 | 8.56 | −0.18 | 34.84 | 56.77 | 100 |
| 2 | 11.01 | 0.17 | 32.37 | 56.45 | 100 |
| 3 | 11.06 | −0.16 | 36.61 | 52.49 | 100 |
| 4 | 13.44 | 0.63 | 29.7 | 56.23 | 100 |
| 5 | 14.22 | 0.64 | 35.61 | 49.54 | 100 |
| 6 | 20.1 | 1 | 28.53 | 50.37 | 100 |
| 7 | 12.12 | 0.13 | 36.25 | 52.5 | 100 |
| 8 | 21.16 | 1.13 | 28.72 | 49 | 100 |
| 9 | 70.13 | 22.41 | 3.2 | 4.26 | 100 |
| Mean | 20.2 | 2.86 | 29.43 | 47.51 | 100 |
| Std. Deviation | 19.18 | 7.35 | 10.31 | 16.49 | |
| Max. | 70.13 | 22.41 | 36.61 | 56.77 | |
| Min. | 8.56 | −0.18 | 3.2 | 4.26 | |

All results in Atomic Percent

It should be noted that it is the silver:paladium ratio that is important, not the total percentage of each element as the analyses show differing amounts of other elements of the cathode.

Figure 7:
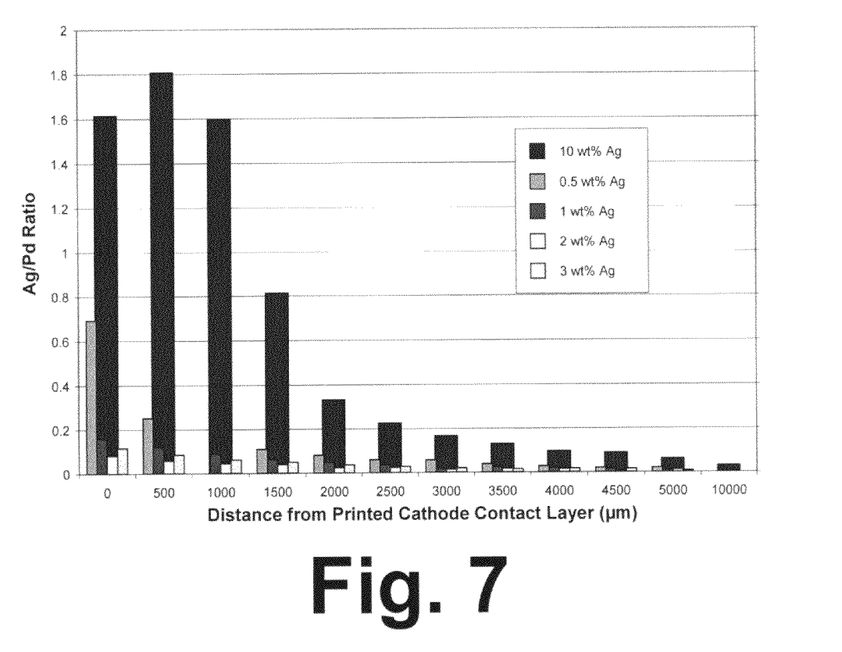
FIG. 7 is a diagram showing the Ag/Pd ratio in the cathode electrode as a function of distance from the cathode contact paste layer for various concentrations of silver.
Figure 8:
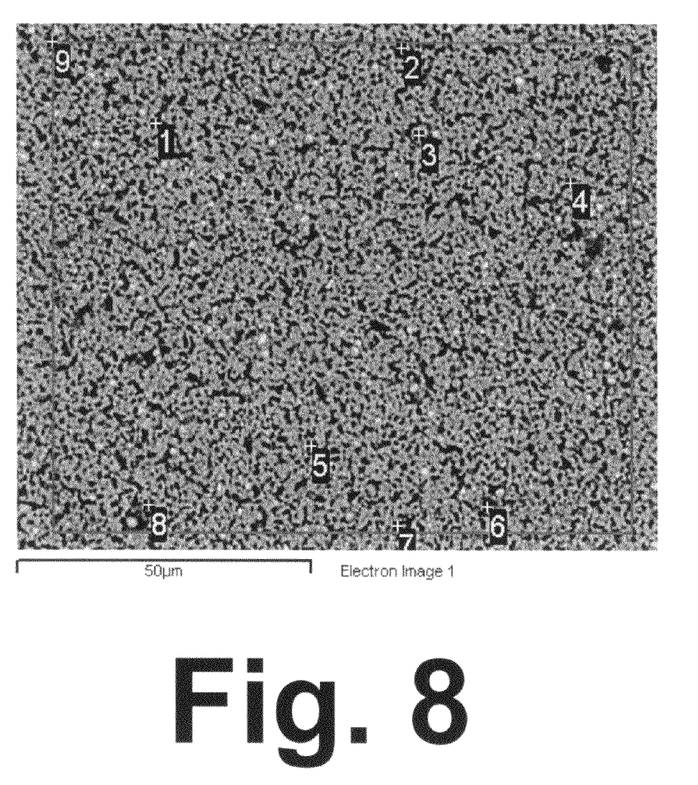
FIG. 8 is an SEM image of the cathode electrode 15 mm from the Ag-LCN printed layer/cathode boundary with EDX analysis showing the extent of Ag diffusion (10% v/v Ag).

FIG. 7 shows the Ag/Pd ratio for different Ag concentrations as a function of distance up to 10 mm from the edge of the printed LCN layer. The diffusion concentration with distance shows a clear trend of decreasing silver:palladium ratio at all distances measured. FIG. 8 shows an SEM image of the cathode 15 mm from the edge of the printed layer and EDX analysis at the points labeled 1-9 show that no silver has diffused this distance even for the highest silver concentration tested. Table 3 shows the analysis of the points labeled in FIG. 8 to illustrate that no silver diffusion has occurred at a distance of 15 mm from the edge of the printed layer.

TABLE 3

| Spectrum | O | Zr | Pd | Ag | Total |
|---|---|---|---|---|---|
| 1 | 52.83 | 2.53 | 44.9 | −0.32 | 100 |
| 2 | 49.64 | 0.31 | 41.18 | −1.13 | 100 |
| 3 | 61.16 | 3.48 | 35.24 | 0.12 | 100 |
| 4 | 52.27 | 21.28 | 26.67 | −0.23 | 100 |
| 5 | 51.1 | 25.31 | 22.25 | 1.34 | 100 |
| 6 | 48.91 | 1.06 | 50.12 | −0.09 | 100 |
| 7 | 45.9 | 18.48 | 36.31 | −0.69 | 100 |
| 8 | 47.12 | 4.39 | 48.87 | −0.39 | 100 |
| 9 | 72.76 | 24.22 | 2.63 | 0.39 | 100 |
| Mean | 54.63 | 11.23 | 34.25 | −0.11 | 100 |
| Std. Deviation | 8.54 | 10.76 | 15.14 | 0.7 | |
| Max. | 72.76 | 25.31 | 50.12 | 1.34 | |
| Min. | 45.9 | 0.31 | 2.63 | −1.13 | |

All results in Atomic Percent

In general, for all concentrations, it was found that silver was still present 5 mm from the printed layer, and even 10 mm in the case of 10% v/v silver (equivalent to 13.5% w/w) though in very low concentrations at this distance. This diffusion profile is indicative of the ability to control the silver:palladium ratio in the x-y plane across the cell to allow optimum cathode operation even as the cell experiences a large temperature gradient, such as in the case of high power density operation.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for generating electricity comprising:
   a plurality of planar layered fuel cell units, each said fuel cell unit comprising a solid electrolyte sandwiched between an anode electrode and a cathode electrode;

an electrically conductive flow separator plate disposed between each of said fuel cell units;

a first cathode contact material disposed between, and in direct contact with, a first cathode electrode and a first electrically conductive flow separator plate, wherein said first cathode contact material has a first concentration of an alloying agent; and a second cathode contact material disposed between, and in direct contact with, a second cathode electrode and a second electrically conductive flow separator plate, wherein said second cathode contact material has a second concentration of the alloying agent different than said first concentration, wherein:

the first electrically conductive flow separator plate, the first cathode contact material, and the first cathode electrode are different components; and the second electrically conductive flow separator plate, the second cathode contact material, and the second cathode electrode are different components, wherein said alloying agent in said first cathode contact material reacts with the first cathode electrode to form a first alloy, and said alloying agent in said second cathode contact material reacts with the second cathode electrode to form a second alloy, wherein said alloying agent is a metal selected from the group consisting of Au, Ag, Pt, Cr, Nb, and mixtures and alloys thereof, and wherein said alloying agent in said first alloy and/or said second alloy is in a range of about 1 wt % to about 65 wt %.

2. An apparatus in accordance with claim 1, wherein said alloying agent is Ag.

3. An apparatus in accordance with claim 1, wherein said alloying agent in said first alloy and/or said second alloy is in a range of about 1 wt % to about 50 wt %.

4. An apparatus in accordance with claim 1, wherein said cathode contact material comprises a paste.

5. An apparatus in accordance with claim 1, wherein said alloying agent is distributed in varying amounts in a plane parallel with each layer of said plurality of planar layered fuel cell units.

6. An apparatus in accordance with claim 1, wherein said second cathode electrode is located at a location nearer to either end of said plurality of planar layered fuel cell units than said first cathode electrode.

7. An apparatus in accordance with claim 1, wherein said first cathode electrode does not comprise said first cathode contact material.

8. In a solid oxide fuel cell stack having a plurality of planar layered fuel cell units, the improvement comprising:

a first concentration of an alloying agent in a first cathode contact material at a first location in said solid oxide fuel cell differing from a second concentration of the alloying agent in a second cathode contact material at a second location in said solid oxide fuel cell, wherein:

said second concentration is different than said first concentration;

the first cathode contact material is in direct contact with a first cathode electrode and a first electrically conductive flow separator plate;

the second cathode contact material is in direct contact with a second cathode electrode and a second electrically conductive flow separator plate;

the first electrically conductive flow separator plate, the first cathode contact material, and the first cathode electrode are different components; and the second electrically conductive flow separator plate, the second cathode contact material, and the second cathode electrode are different components, wherein said alloying agent in said first cathode contact material reacts with said first cathode electrode to form a first alloy, and said alloying agent in said second cathode contact material reacts with the second cathode electrode to form a second alloy, and wherein said alloying agent in said first alloy and/or said second alloy is in a range of about 1 wt % to about 65 wt %.

9. A solid oxide fuel cell stack in accordance with claim 8, wherein said alloying agent is a metal selected from the group consisting of Au, Ag, Pt, Cr, Nb, and mixtures and alloys thereof.

10. A solid oxide fuel cell stack in accordance with claim 9, wherein said alloying agent is Ag.

11. A solid oxide fuel cell stack in accordance with claim 8, wherein said alloying agent in said first alloy and/or said second alloy is in a range of about 1 wt % to about 50 wt %.

12. A solid oxide fuel cell stack in accordance with claim 8, wherein said plurality of planar layered fuel cell units are anode supported.

13. In a solid oxide fuel cell stack having a plurality of planar layered fuel cell units, a method for modifying properties of said plurality of planar layered fuel cell units in accordance with their location within said solid oxide fuel cell stack comprising:

adding an alloying agent to at least one cathode contact material disposed between one of a plurality of cathode electrodes and one of a plurality of electrically conductive flow separator plates of the solid oxide fuel cell stack, said alloying agent reacting with an adjacent cathode electrode to form an alloy, wherein said alloying agent is added in an amount which is variable based upon a location of said at least one cathode contact material within said solid oxide fuel cell stack, and wherein each of the at least one cathode contact material is in direct contact with at least one of the plurality of cathode electrodes and at least one of the plurality of electrically conductive flow separator plates, wherein each of the plurality of electrically conductive flow separator plates, the at least one cathode contact material, and the plurality of cathode electrodes are different components, wherein said alloying agent in said alloy is in a range of about 1 wt % to about 65 wt %.

14. A method in accordance with claim 13, wherein said alloying agent is a metal selected from the group consisting of Au, Ag, Pt, Cr, Nb, and mixtures and alloys thereof.

15. A method in accordance with claim 14, wherein said alloying agent is Ag.

16. A method in accordance with claim 13, wherein said alloying agent in said alloy is in a range of about 1 wt % to about 50 wt %.

* * * * *